United States Patent
Kondo et al.

(10) Patent No.: US 10,444,360 B2
(45) Date of Patent: Oct. 15, 2019

(54) DISPLACEMENT MEASUREMENT DEVICE, MEASUREMENT SYSTEM, AND DISPLACEMENT MEASUREMENT METHOD

(71) Applicant: OMRON Corporation, Kyoto (JP)

(72) Inventors: Tomonori Kondo, Fukuchiyama (JP); Yuta Suzuki, Ayabe (JP); Kenichi Matoba, Otsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/893,702

(22) Filed: Feb. 12, 2018

(65) Prior Publication Data

US 2019/0094368 A1    Mar. 28, 2019

(30) Foreign Application Priority Data

Sep. 26, 2017    (JP) .................................. 2017-185000

(51) Int. Cl.
*G01B 11/25*    (2006.01)
*G01S 17/46*    (2006.01)
(Continued)

(52) U.S. Cl.
CPC .............. *G01S 17/46* (2013.01); *G01B 11/06* (2013.01); *G01B 11/0608* (2013.01);
(Continued)

(58) Field of Classification Search
CPC ........ G01B 11/24; G01B 11/14; G01N 21/27; G01N 2201/068
(Continued)

(56) References Cited

U.S. PATENT DOCUMENTS

| 4,730,927 A | * | 3/1988 | Ototake | ............... | G01B 11/303 |
|---|---|---|---|---|---|
| | | | | | 356/609 |
| 6,674,572 B1 | * | 1/2004 | Scheruebl | .......... | G02B 21/0024 |
| | | | | | 356/237.5 |

(Continued)

FOREIGN PATENT DOCUMENTS

| EP | 2060869 | 5/2009 |
|---|---|---|
| EP | 2278268 | 1/2011 |

(Continued)

OTHER PUBLICATIONS

H Nouira, et al., "Characterization of the main error sources of chromatic confocal probes for dimensional measurement," Measurement Science and Technology, vol. 25, No. 4, Mar. 5, 2014, pp. 1-14.

(Continued)

*Primary Examiner* — Hoa Q Pham
(74) *Attorney, Agent, or Firm* — JCIPRNET

(57) ABSTRACT

A displacement measurement device and a measurement method are provided. A displacement measurement device includes a light projecting unit configured to generate a light beam; a sensor head configured to emit the light beam to a measurement target object and receive a light beam reflected at the measurement target surface within the emitted light beam; a storage unit configured to store a function using a distance between the sensor head and the measurement target surface as a variable; and a control unit configured to calculate the distance based on a wavelength of the light received by the sensor head. The control unit calculates a value of the function using a distance between the sensor head and the measurement target surface of the measurement target object as a value of the variable. The control unit corrects the calculated distance using the calculated value of the function.

18 Claims, 11 Drawing Sheets

(51) Int. Cl.
*G01S 7/481* (2006.01)
*G01B 21/04* (2006.01)
*G01B 11/06* (2006.01)

(52) U.S. Cl.
CPC ......... *G01B 21/042* (2013.01); *G01B 21/045* (2013.01); *G01S 7/4811* (2013.01); *G01B 2210/50* (2013.01)

(58) Field of Classification Search
USPC .................................................. 356/601–623
See application file for complete search history.

(56) References Cited

U.S. PATENT DOCUMENTS

| | | | | |
|---|---|---|---|---|
| 8,427,644 B2* | 4/2013 | Miki | .................... | G01B 11/026 356/364 |
| 9,488,468 B2 | 11/2016 | Tsujii et al. | | |
| 2002/0117632 A1* | 8/2002 | Hakamata | .......... | G01N 21/6428 250/458.1 |
| 2004/0109170 A1* | 6/2004 | Schick | ................. | G01B 11/026 356/614 |
| 2005/0030528 A1* | 2/2005 | Geffen | ................. | G01B 11/026 356/237.1 |
| 2007/0148792 A1 | 6/2007 | Marx et al. | | |
| 2013/0022815 A1* | 1/2013 | Oki | .................... | C01G 45/1207 428/402 |
| 2014/0218730 A1* | 8/2014 | Yamazaki | .......... | G01B 11/0608 356/326 |
| 2014/0268093 A1 | 9/2014 | Tohme et al. | | |
| 2015/0009484 A1* | 1/2015 | Sesko | .................. | G01B 11/007 356/3 |
| 2016/0258742 A1* | 9/2016 | Kubo | .................. | G02B 21/0064 |
| 2017/0276475 A1* | 9/2017 | Morino | .................. | G01B 11/14 |
| 2018/0203119 A1* | 7/2018 | Kern | .................... | G01B 21/042 |
| 2018/0364034 A1* | 12/2018 | Reiter | ................ | G01B 11/2518 |
| 2019/0094013 A1* | 3/2019 | Kondo | .................... | G06F 17/11 |

FOREIGN PATENT DOCUMENTS

| | | |
|---|---|---|
| JP | H07120216 | 5/1995 |
| JP | 2012208102 | 10/2012 |
| JP | 2015135292 | 7/2015 |
| TW | I285257 | 8/2007 |
| TW | I359258 | 3/2012 |
| TW | I473970 | 2/2015 |
| TW | I507657 | 11/2015 |
| WO | 2017046254 | 3/2017 |

OTHER PUBLICATIONS

"Search Report of Europe Counterpart Application", dated May 2, 2018, p. 1-p. 10.

"Office Action of Taiwan Counterpart Application," dated Aug. 6, 2018, with English translation thereof, p. 1-8.

Office Action of Korean Counterpart Application, with English translation thereof, dated Oct. 22, 2018, pp. 1-10.

Office Action of Korean Counterpart Application, with English translation thereof, dated Apr. 8, 2019, pp. 1-24.

* cited by examiner

DISPLACEMENT MEASUREMENT DEVICE, MEASUREMENT SYSTEM, AND DISPLACEMENT MEASUREMENT METHOD

CROSS-REFERENCE TO RELATED APPLICATION

This application claims the priority of Japan patent application serial no. 2017-185000, filed on Sep. 26, 2017. The entirety of the above-mentioned patent application is hereby incorporated by reference herein and made a part of this specification.

BACKGROUND

Technical Field

The disclosure relates to a displacement measurement device, a measurement system, and a displacement measurement method.

Description of Related Art

In the related art, for example, as described in Patent Document 1 (Japanese Laid-open No. 2012-208102), a displacement measurement device using a white confocal method as a measurement method is known. According to such a displacement measurement device, it is possible to measure a distance to a measurement target object (specifically, a measurement target surface) based on a wavelength of a received light beam.

In a general displacement measurement device, when correction is performed with a reference workpiece during production, linearity between a distance and a measured value is secured. However, since correction in a production process is performed based on a reference workpiece, when a user uses a displacement measurement device in a production process, the relationship between a distance and a measured value may be nonlinear depending on workpieces.

Such an error is a nonlinear error. Therefore, it is difficult to reduce the error in a method of correcting the entire measurement range using one linear function.

For example, in measurement by a displacement measurement device using a white confocal method, errors occur as follows. When a measurement target surface is a front surface of a thin film formed on a substrate, due to interference caused by the thin film, the detected wavelength deviates from a wavelength at which a focus is formed on the front surface of the thin film.

In addition, when a distance to a measurement target surface of a measurement target object is measured through a transparent member such as a glass, a refractive index by which wavelength dispersion occurs makes the relationship between a distance and a detection wavelength differs.

Moreover, even when a distance to a front surface of the transparent member such as a glass and a distance to a back surface thereof are measured so as to measure a thickness of the transparent member, regarding measurement of the distance to the back surface, a refractive index by which wavelength dispersion occurs makes the relationship between the distance and a detection wavelength differs.

SUMMARY

According to an embodiment of the disclosure, there is provided a displacement measurement device that includes a light projecting unit configured to generate a light beam; a sensor head configured to emit the light beam to a measurement target object of which a measured value and an actual displacement are nonlinear so that a focus is formed on a measurement target surface of the measurement target object and receive a light beam that is reflected at the measurement target surface within the emitted light beam; a storage unit configured to store a function using a distance between the sensor head and the measurement target surface as a variable; and a control unit configured to calculate the distance based on a wavelength of the light beam received by the sensor head. The control unit calculates a value of the function by using a first distance between the sensor head and a measurement target surface of a first measurement target object which is the measurement target object as a value of the variable. The control unit corrects the calculated first distance using the calculated value of the function.

According to another embodiment of the disclosure, there is provided a displacement measurement device that includes a light projecting unit configured to generate a light beam having a predetermined wavelength width; a sensor head configured to emit the light beam through a member by which wavelength dispersion occurs according to a refractive index so that a focus is formed on a measurement target surface of a measurement target object and receive a light beam that is reflected at the measurement target surface within the emitted light beam; a storage unit configured to store a function using a distance between the sensor head and the measurement target surface as a variable; and a control unit configured to calculate the distance based on a wavelength of the light beam received by the sensor head. The control unit calculates a value of the function by using a first distance between the sensor head and a measurement target surface of a first measurement target object which is the measurement target object as a value of the variable. The control unit corrects the calculated first distance using the calculated value of the function.

According to another embodiment of the disclosure, there is provided a measurement system that includes a displacement measurement device and an information processing device that is communicatively connected to the displacement measurement device. The information processing device receives a user operation by which the second distance that is calculated at each of the plurality of positions and the reference distance is inputted to the information processing device, and transmits the second distance that is calculated at each of the plurality of positions and the reference distance to the displacement measurement device.

According to another embodiment of the disclosure, there is provided displacement measurement method includes: a step of generating a light beam; a step of emitting the light beam to a measurement target object of which a measured value and an actual displacement are nonlinear from a sensor head so that a focus is formed on a measurement target surface of the measurement target object; a step of receiving a light beam that is reflected at the measurement target surface within the emitted light beam; a step of calculating a distance between the sensor head and the measurement target surface based on a wavelength of the received light beam; a step of calculating a value of a function by serving the calculated distance as a value of a variable in the function using the distance as the variable; and a step of correcting the calculated distance using the calculated value of the function.

According to another embodiment of the disclosure, there is provided displacement measurement method includes: a step of generating a light beam having a predetermined wavelength width; a step of emitting the light beam from a sensor head through a member by which wavelength dispersion occurs according to a refractive index so that a focus is formed on a measurement target surface of a measurement target object; a step of receiving a light beam that is reflected at the measurement target surface within the emitted light beam; a step of calculating a distance between the sensor head and the measurement target surface based on a wavelength of the received light beam; a step of calculating a value of a function by serving the calculated distance as a value of a variable in the function using the distance as the variable; and a step of correcting the calculated distance using the calculated value of the function.

DESCRIPTION OF THE EMBODIMENTS

Figure 1:
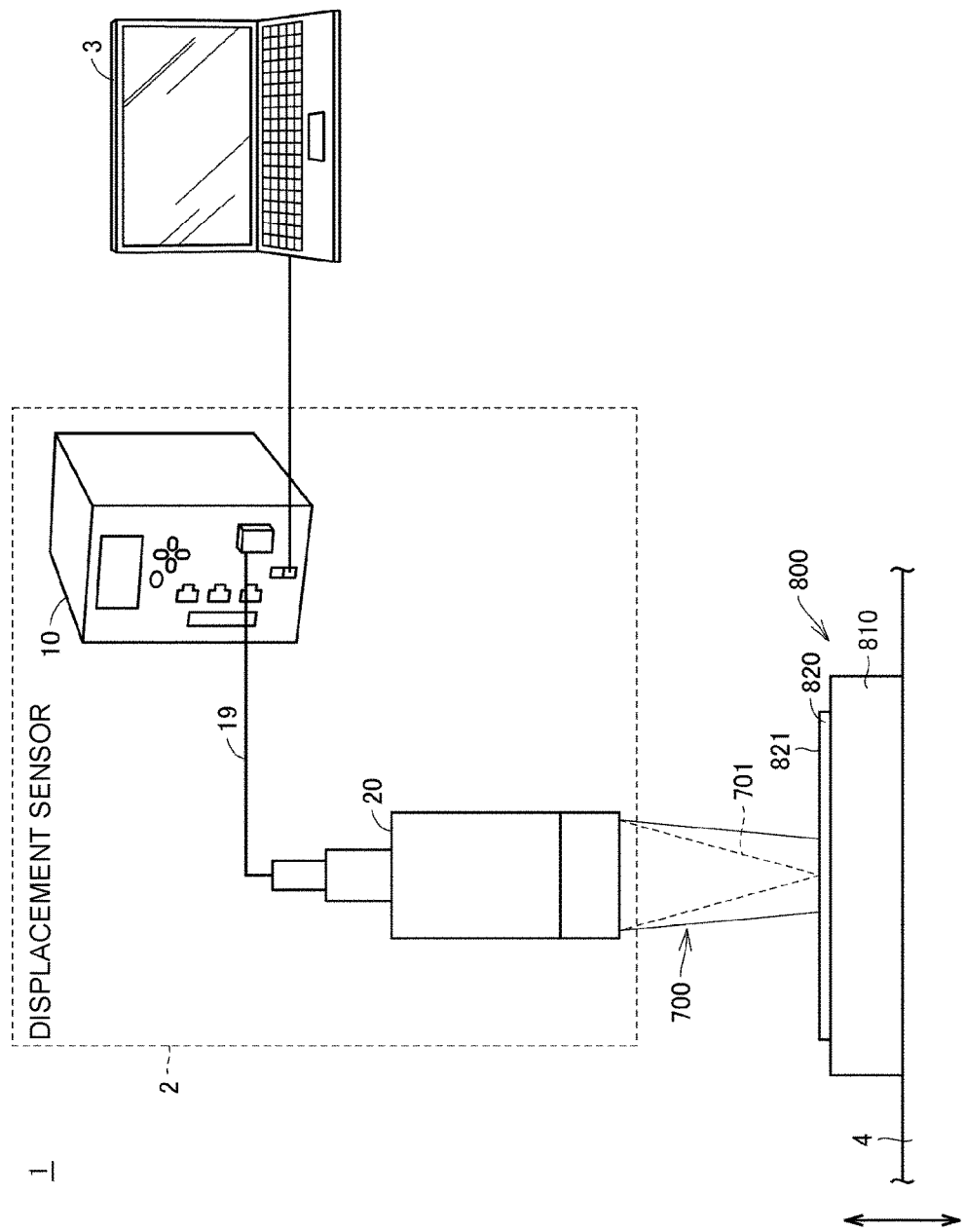
FIG. 1 is a diagram showing a configuration of a measurement system according to the present embodiment.

Embodiments of the disclosure will be described below with reference to the drawings. In the following description, the same components are denoted with the same reference numerals. Their names and functions are also the same. Therefore, detailed description thereof will not be repeated.

The embodiments of the disclosure provide a displacement measurement device and a measurement method through which it is possible to measure a distance to a measurement target surface with high accuracy.

According to the embodiments of the disclosure, it is possible to measure a distance to a measurement target surface with high accuracy.

In Embodiment 1, a case in which an error occurs due to interference will be described. In Embodiments 2 and 3, a case in which an error occurs due to wavelength dispersion will be described.

Specifically, in Embodiments 1 and 3, a case in which a measurement target object of which a measured value and an actual displacement are nonlinear is measured will be described. More specifically, in Embodiment 1, a case in which a measurement target object causes interference will be exemplified. In addition, in Embodiment 3, a case in which wavelength dispersion occurs according to a refractive index in a measurement target object will be exemplified.

In Embodiment 2, a case in which a measurement target object is measured through a member by which wavelength dispersion occurs according to a refractive index will be described.

In addition, in the following embodiments, an example in which measurement is performed using a white confocal method will be exemplified. However, the measurement method is not limited thereto.

Embodiment 1

A. System Configuration

FIG. 1 is a diagram showing a configuration of a measurement system according to the present embodiment.

Referring to FIG. 1, a measurement system 1 includes a displacement sensor 2, an information processing device 3, and a stage 4. Typically, the information processing device 3 is a personal computer.

The displacement sensor 2 is a displacement measurement device using a white confocal method as a measurement method. The displacement sensor 2 is also called a fiber coaxial displacement sensor. The displacement sensor 2 includes a sensor controller 10, a light guiding unit 19, and a sensor head 20. The sensor head 20 includes a confocal optical system. Specifically, the sensor head 20 includes an objective lens and a chromatic aberration unit.

The sensor controller 10 generates a light beam having a predetermined wavelength spread (wavelength width). Typically, the sensor controller 10 generates a white light beam. This light beam propagates through the light guiding unit 19 and reaches the sensor head 20.

In the sensor head 20, the propagated light beam is focused by the objective lens and is emitted to a measurement target object 800. Since axial chromatic aberration occurs in an emission light beam 700 passing through the chromatic aberration unit, focus positions of emission light beams emitted from the objective lens differ for each wavelength. Only a light beam with a wavelength at which a focus is formed on the measurement target object 800 reenters the light guiding unit 19.

The stage 4 is movable in a direction (a vertical direction indicated by an arrow) on an optical axis of the emission light beam 700. The sensor controller 10 controls movement of the stage 4. The measurement target object 800 is mounted on the stage 4.

The measurement target object 800 includes a substrate (base) 810 and a thin film 820 formed on the substrate 810. Here, a front surface 821 is a surface that is exposed to the outside.

A light beam 701 with a wavelength at which a focus is formed on the front surface 821 is received by the sensor head 20 as a reflected light beam. The reflected light beam received by the sensor head 20 enters the sensor controller 10 through the light guiding unit 19. The sensor controller 10 calculates a distance (displacement) from the sensor head 20 to the front surface 821 on the basis of the reflected light beam.

The information processing device 3 is connected to the sensor controller 10. The information processing device 3 can change various settings of the sensor controller 10. In addition, in the information processing device 3, information such as a distance calculated by the sensor controller 10 can be displayed. Various functions of the information processing device 3 will be described below. Here, such settings and display are possible in the single sensor controller 10.

Here, since hardware configurations of the sensor controller 10, the sensor head 20, and the light guiding unit 19 are the same as those in the related art, descriptions thereof will not be repeated here.

Since the displacement sensor 2 measures a distance between the sensor head 20 and the front surface 821 of the thin film 820, the detected wavelength deviates from a wavelength at which a focus is formed on the front surface 821 of the thin film 820 due to interference by the thin film 820. Therefore, it is necessary to correct a measured value. Details of correction will be described below.

B. Correction Process (b1. Overview)

The displacement sensor 2 generates a function used when a plurality of measurement target objects 800 typically with the same lot (or the same type) are measured before such lots are measured (hereinafter also referred to as "during the present measurement") by preliminary measurement. The function is used to correct a measured value (distance). In the function, a measured value that can be measured by the displacement sensor 2 is used as a variable.

In addition, the displacement sensor 2 generates the function using measured values measured at each of a plurality of positions when the stage 4 is moved to the plurality of positions. Typically, the displacement sensor 2 generates a plurality of continuous linear functions as the function.

The displacement sensor 2 measures a distance to the front surface 821 which is a measurement target surface, and performs correction using a linear function corresponding to the measured value (distance). Specifically, the displacement sensor 2 corrects a measured value using a value of a linear function when the measured value is used as a value of a variable.

Details of such processes will be described below with reference to a specific example. Hereinafter, each position (a position in a vertical direction) of the stage 4 when the stage 4 is moved as indicated by an arrow in FIG. 1 will be referred to as a "stage position" for convenience of explanation.

(b2. Details)

(1) Process of Generating Linear Function

Figure 2:
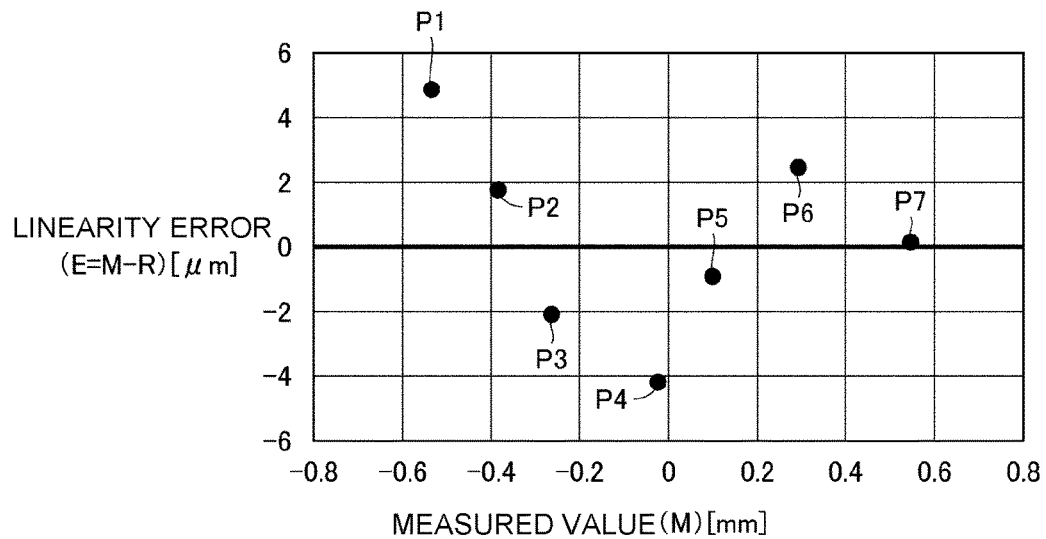
FIG. 2 is a diagram explaining data processing for generating a plurality of continuous linear functions.

FIG. 2 is a diagram explaining data processing for generating a plurality of continuous linear functions.

Referring to FIG. 2, a horizontal axis (also referred to as an "X axis") of the graph represents a measured value M measured by the displacement sensor 2. That is, the horizontal axis represents a distance between the sensor head 20 and the front surface 821 of the thin film 820 measured by the displacement sensor 2. Here, the value on the horizontal axis is a value obtained by performing offsetting on the measured value. Specifically, on the horizontal axis, a median value of the range of measured values obtained when the displacement sensor 2 measures the measurement target object 800 is set to 0.

The vertical axis (also referred to as a "Y axis") of the graph represents a linearity error E. Specifically, the vertical axis represents a value (E=M−R) obtained by subtracting an ideal value R from the measured value M. Here, the "ideal value R" refers to a value set by a user and refers to a value indicating an ideal distance (reference distance) from the sensor head 20 to the front surface 821 of the thin film 820. The ideal value R is a value calculated from the stage position.

The user measures a distance between the sensor head 20 and the front surface 821 of the thin film 820 at a plurality of stage positions by moving the stage 4 a plurality of times. For example, in order to obtain seven points P1 to P7 as shown in FIG. 2, the user performs measurement seven times using the displacement sensor 2.

Hereinafter, for convenience of explanation, an X coordinate of a point Pi (i is a natural number of 1 to 7) will be represented as "Mi" and a Y coordinate thereof will be represented as "Ei." In addition, the point Pi is also represented as a "coordinate value Pi(Mi, Ei)." In addition, the ideal value R at the stage position at which the measured value Mi is obtained is referred to as an "ideal value Ri."

Specifically, the displacement sensor 2 calculates a linearity error Ei obtained by subtracting the ideal value Ri from the measured value Mi using the measured values Mi obtained during seven measurements. Therefore, the displacement sensor 2 obtains seven coordinate values Pi(Mi, Ei).

Figure 3:
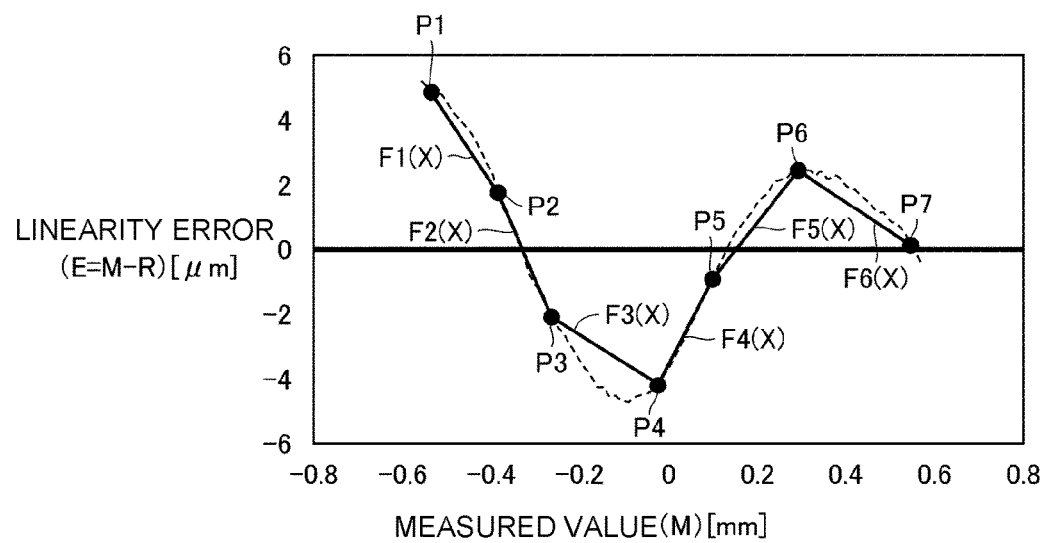
FIG. 3 is a diagram explaining a generated linear function.

FIG. 3 is a diagram explaining the generated linear function.

Referring to FIG. 3, the dashed line graph shows experiment data as a comparative example. The dashed line graph shows data obtained when the stage 4 is continuously moved. In the displacement sensor 2, in a measurement process (that is, during the present measurement) such as product examination, in order to speed up the process, seven points Pi which indicate discrete data items are used to perform correction in place of such continuous data items.

In order to perform linear interpolation, the displacement sensor 2 generates six linear functions Fi(x) using seven coordinate values Pi(Mi, Ei). Specifically, two coordinate values whose X coordinates are adjacent to each other among the seven coordinate values Pi(Mi, Ei) are connected by a straight line and thus six continuous linear functions F1(X) to F6(X) are generated. For example, the displacement sensor 2 generates a linear function F1(X) using a coordinate value P1(M1, E1) and a coordinate value P2(M2, E2).

Each linear function Fi(x) is represented by the following Formula (1).

$$Fi(x)=AX+B \tag{1}$$

Here, in Formula (1), the measured value M obtained during the present measurement is assigned as a value of a variable X.

In Formula (1), "A" indicates a slope of a line segment connecting two coordinate values whose X coordinates are adjacent to each other. In Formula (1), "B" indicates a value of the linearity error Ei (=Ri−Mi) at an end point on the left side of each line segment.

The linear functions F1(X) to F6(X) are specifically represented as follows.

$$F1(X)=((E2-E1)/(M2-M1))\times X+E1$$

$$F2(X)=((E3-E2)/(M3-M2))\times X+E2$$

$$F3(X)=((E4-E3)/(M4-M3))\times X+E3$$

$$F4(X)=((E5-E4)/(M5-M4))\times X+E4$$

$$F5(X)=((E6-E5)/(M6-M5))\times X+E5$$

$$F6(X)=((E7-E6)/(M7-M6))\times X+E6$$

When these six linear functions are generalized using i, Formula (2) is obtained.

$$Fi(x)=((E(i+1)-Ei)/(M(i+1)-Mi))\times X+Ei \tag{2}$$

In a measured value during the present measurement, a function to be used differs according to a value of X (that is, the measured value M). For example, when the measured value M is a value included in a range of M1 to M2, the linear function F1(X) is used.

In generalization using i, when the measured value M is a value included in a range of Mi to M(i+1), the linear function Fi(x) is used.

(2) Specific Example of Correction

As described above, the displacement sensor 2 corrects the measured value using the linear functions F1(X) to F6(X) during the present measurement.

Figure 4:
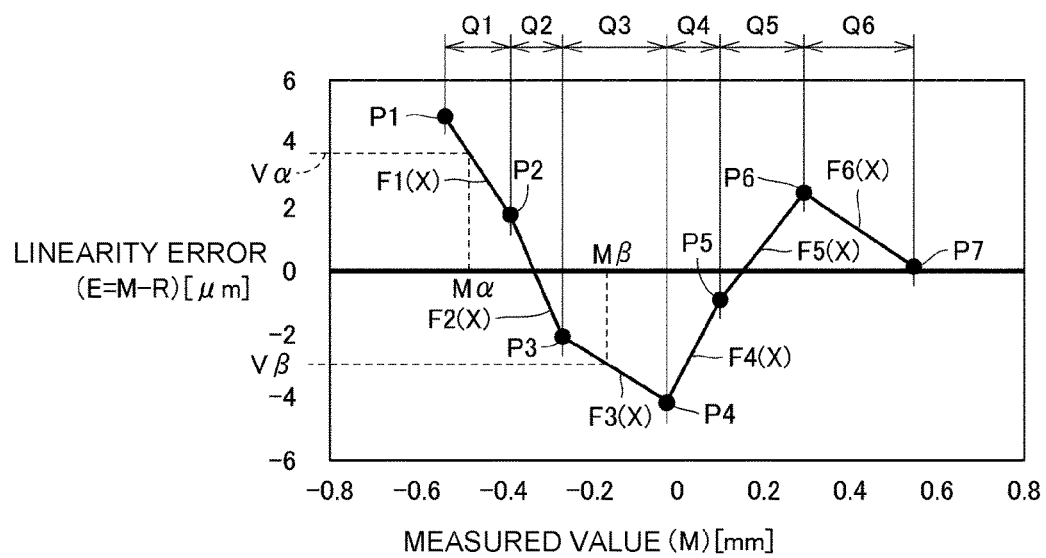
FIG. 4 is a diagram explaining correction of a measured value.

FIG. 4 is a diagram explaining correction of the measured value.

Referring to FIG. 4, when the calculated measured value M (distance, value of the variable X) is a value included in a section Qi (Mi<M<M(i+1)) in an X axis direction, the displacement sensor 2 corrects the measured value M using the linear function Fi(x).

Specifically, the displacement sensor 2 performs correction using the following Formula (3) and thus obtains the corrected measured value C.

$$C = M - Fi(x) \quad (3)$$

For example, when a value Ma in a section Q1 shown in the drawing is obtained as the measured value M, the displacement sensor 2 subtracts a value Vα (=F1(Mα)) of a function when a value of X of the function F1(X) is set as Mα from Mα, and thus the corrected measured value C is obtained.

In addition, when a value Mβ in a section Q3 shown in the drawing is obtained as the measured value M, the displacement sensor 2 subtracts a value Vβ (=F3(Mβ)) of a function when a value of X of the function F3(X) is set as Mβ from Mβ, and thus the corrected measured value C is obtained.

Here, the displacement sensor 2 may correct the measured value by using the following Formula (4) in place of the above Formula (2) and the following Formula (5) in place of the above Formula (3).

$$Fi(x) = ((-E(i+1) + Ei)/(M(i+1) - Mi)) \times X - Ei \quad (4)$$

$$C = M + Fi(x) \quad (5)$$

In the same manner, the displacement sensor 2 performs the above correction on measured values (distances) obtained when measurement target surfaces of a plurality of measurement target objects 800 with the same lot are measured.

When such correction is performed, a nonlinear error due to interference can be corrected. Therefore, according to the displacement sensor 2, it is possible to measure a distance from the front surface of the thin film which is a measurement target surface with high accuracy.

C. Functional Configuration

Figure 5:
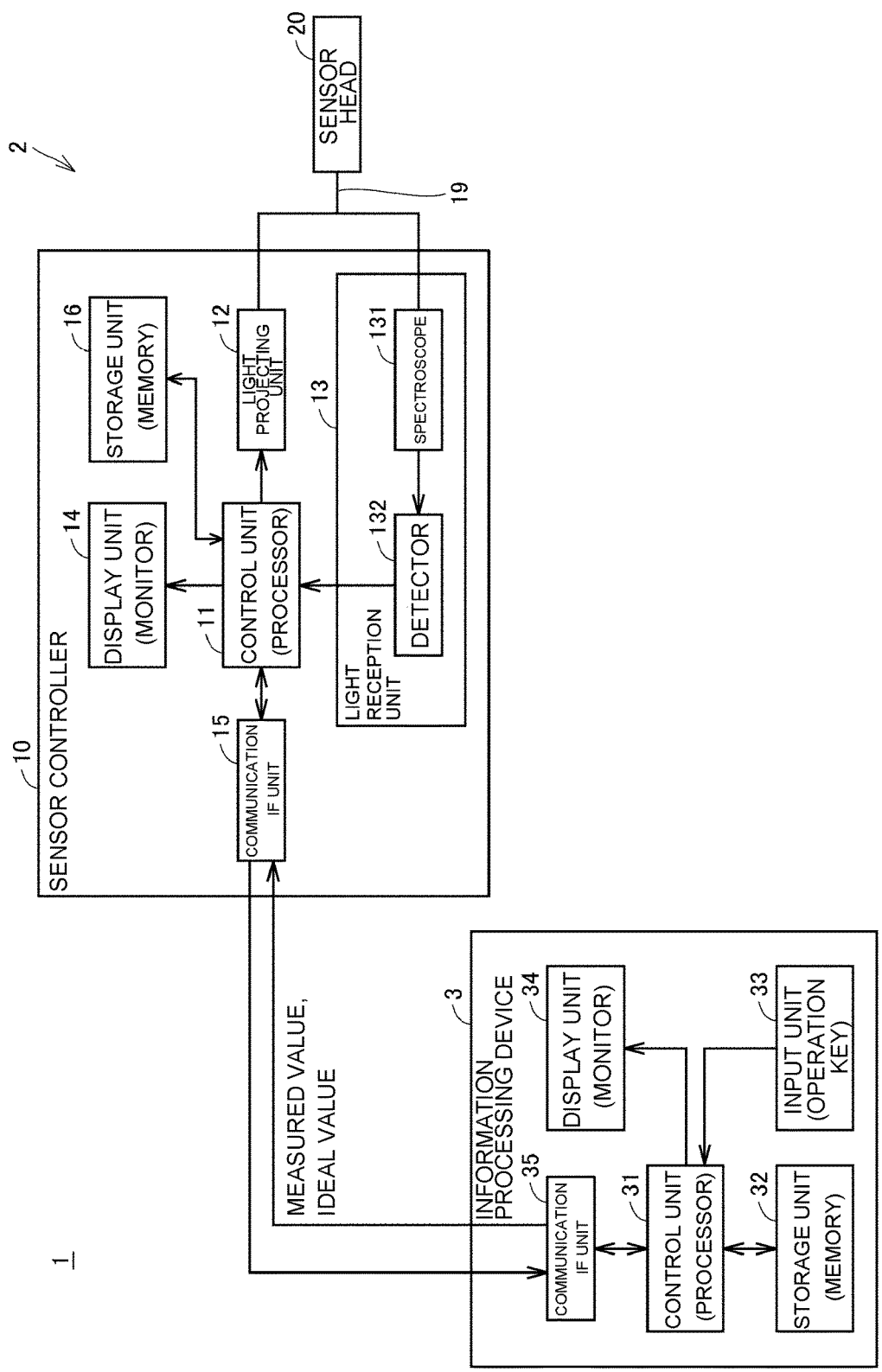
FIG. 5 is a diagram explaining a functional configuration of a measurement system.

FIG. 5 is a diagram explaining a functional configuration of the measurement system 1.

Referring to FIG. 5, as described above, the measurement system 1 includes the displacement sensor 2 and the information processing device 3. The displacement sensor 2 includes the sensor controller 10, the light guiding unit 19, and the sensor head 20.

The sensor controller 10 includes a control unit 11, a light projecting unit 12, a light reception unit 13, a display unit 14, a communication interface (IF) unit 15, and a storage unit 16. The light reception unit 13 includes a spectroscope 131 and a detector 132.

An emission light beam with a predetermined wavelength width generated by the light projecting unit 12 propagates through the light guiding unit 19 and reaches the sensor head 20. A reflected light beam that enters the sensor head 20 again propagates through the light guiding unit 19 and enters the light reception unit 13. In the light reception unit 13, the reflected light beam that has entered the spectroscope 131 is separated into wavelength components, and the detector 132 detects an intensity of each wavelength component.

The control unit 11 calculates a distance (displacement) from the sensor head 20 to a measurement target surface of the measurement target object 800 (for example, the front surface 821 of the thin film 820) on the basis of the detection result of the detector 132. The control unit 11 generates the linear function Fi(x) and stores it in the storage unit 16. The control unit 11 appropriately reads the linear function Fi(x) and corrects the measured value using the linear function.

The display unit 14 displays the distance calculated by the control unit 11 as a numerical value.

Among a plurality of light receiving elements constituting the detector 132 of the light reception unit 13, a light receiving element configured to receive a reflected light beam differs according to a shape of a front surface of the measurement target object 800 with respect to the sensor head 20. Therefore, based on the detection result (pixel information) obtained by the plurality of light receiving elements of the detector 132, it is possible to measure a change in distance (displacement) with respect to the measurement target surface of the measurement target object 800. Therefore, a shape of the measurement target surface of the measurement target object 800 can be measured by the displacement sensor 2.

The communication IF unit 15 is used for communication with the information processing device 3.

The information processing device 3 includes a control unit 31, a storage unit 32, an input unit 33, a display unit 34, and a communication IF unit 35.

The control unit 31 controls an operation of the information processing device 3. The control unit 31 executes a predetermined application program in an operating system stored in the storage unit 32. An example of a screen (user interface) displayed on the display unit 34 when the application program is executed will be described below.

The control unit 31 receives a user input (input operation) through the input unit 33. In addition, the control unit 31 outputs a screen to the display unit 34. The control unit 31 performs communication with the sensor controller 10 through the communication IF unit 35.

The information processing device 3 receives inputs of a predetermined number of (seven in the example in FIG. 2) of the measured values M and the ideal values R when the measured values M are obtained based on a user operation on the input unit 33. The information processing device 3 displays a screen (refer to FIG. 6) for receiving inputs of such values on the display unit 34.

The information processing device 3 transmits sets of a plurality of received values (a set of the measured value M and the ideal value R) to the sensor controller 10. The information processing device 3 transmits seven sets of data in the case of FIG. 2.

The control unit 11 of the sensor controller 10 generates a plurality of linear functions Fi(X) used for correction based on sets of a plurality of values (a set of the measured value and the ideal value) received from the information processing device 3. The control unit 11 corrects the measured values (distances) using the generated linear function Fi(X) for the measurement target objects with the same lot during the measurement.

Here, the number of sets of data items (the measured value and the ideal value) input to the information processing device 3 by the user is not limited to seven. Such a number can be arbitrarily determined by the user.

D. User Interface

Figures 6A, 6B:
FIG. 6A and FIG. 6B show diagrams of a screen example displayed on a display unit of an information processing device.

FIG. 6A and FIG. 6B show diagrams of a screen example displayed on the display unit 34 of the information processing device 3.

Referring to FIG. 6A and FIG. 6B, the control unit 31 of the information processing device 3 displays a screen 341 for inputting the measured value (a distance calculated by the displacement sensor 2) and the ideal value at each stage position. Typically, the control unit 31 displays the screen 341 superimposed on a base screen.

In a state of FIG. 6A, a state in which fifth data (the measured value and the ideal value) is input based on a user operation. In order to input sixth data, the user selects an object 342. Therefore, the control unit 31 of the information processing device 3 displays a screen for inputting sixth data.

When the user determines that five data items are sufficient, he or she may select an object 343 indicating end. Therefore, the screen transitions to a screen as shown in a state of FIG. 6B and input of plurality of data items for correction ends.

When the user selects an object 349 indicating end, a set of input data items is transmitted to the sensor controller 10 of the displacement sensor 2. Therefore, the linear function Fi(X) is generated in the sensor controller 10.

E. Control Structure

First, generation of a linear function Fi(X) used for correction will be described with reference to FIG. 7 and FIG. 8. A process of correcting a measured value using the generated linear function Fi(X) during the present measurement will be described with reference to FIG. 9.

Figure 7:
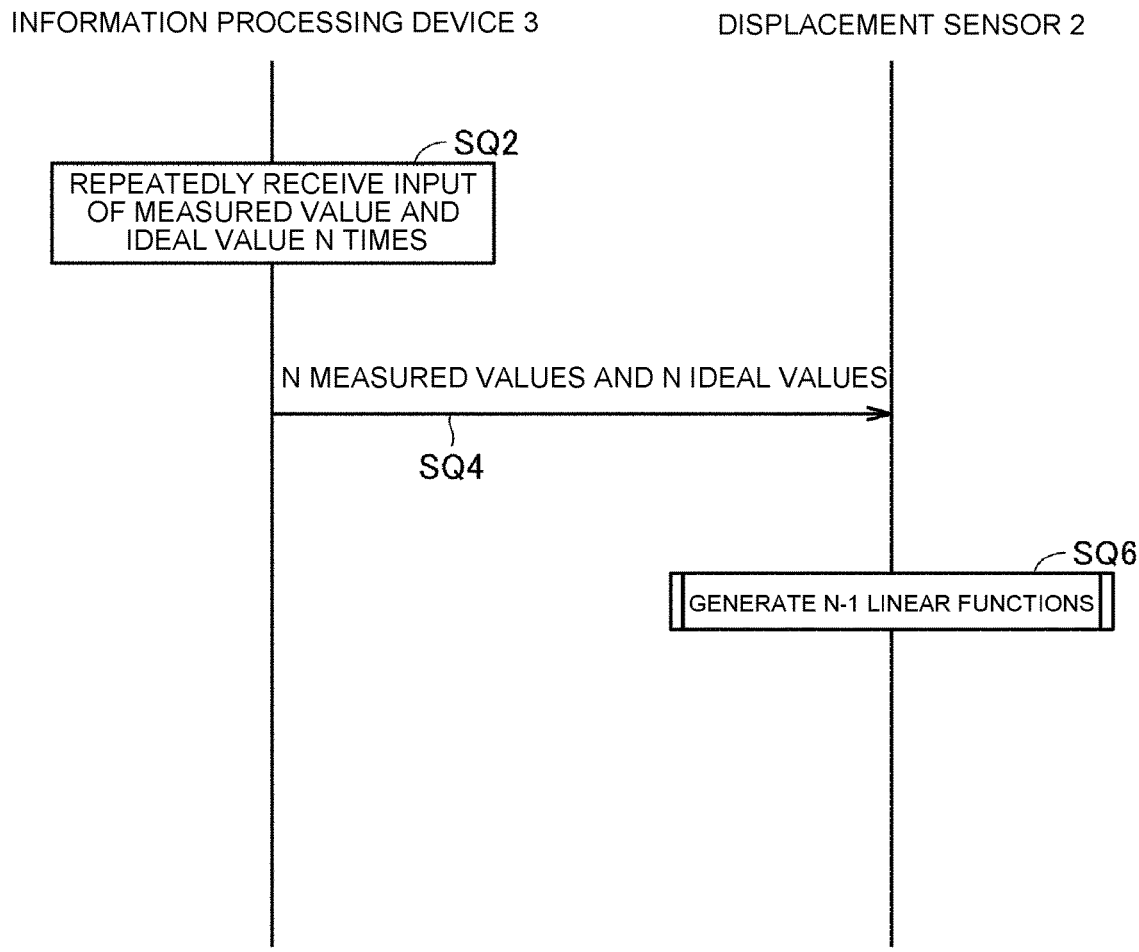
FIG. 7 is a sequence diagram explaining a flow of processes in a measurement system.

FIG. 7 is a sequence diagram explaining a flow of processes in the measurement system 1.

Referring to FIG. 7, in a sequence SQ2, the information processing device 3 repeatedly receives inputs of the measured value and the ideal value N times. For example, in the case of FIG. 2, seven inputs are received.

In a sequence SQ4, the information processing device 3 transmits N measured values M and N ideal values R to the displacement sensor 2. That is, the information processing device 3 transmits N sets of data items to the displacement sensor 2.

In a sequence SQ6, the displacement sensor 2 generates N−1 linear functions Fi(X) based on the N measured values M and the N ideal values R.

Figure 8:
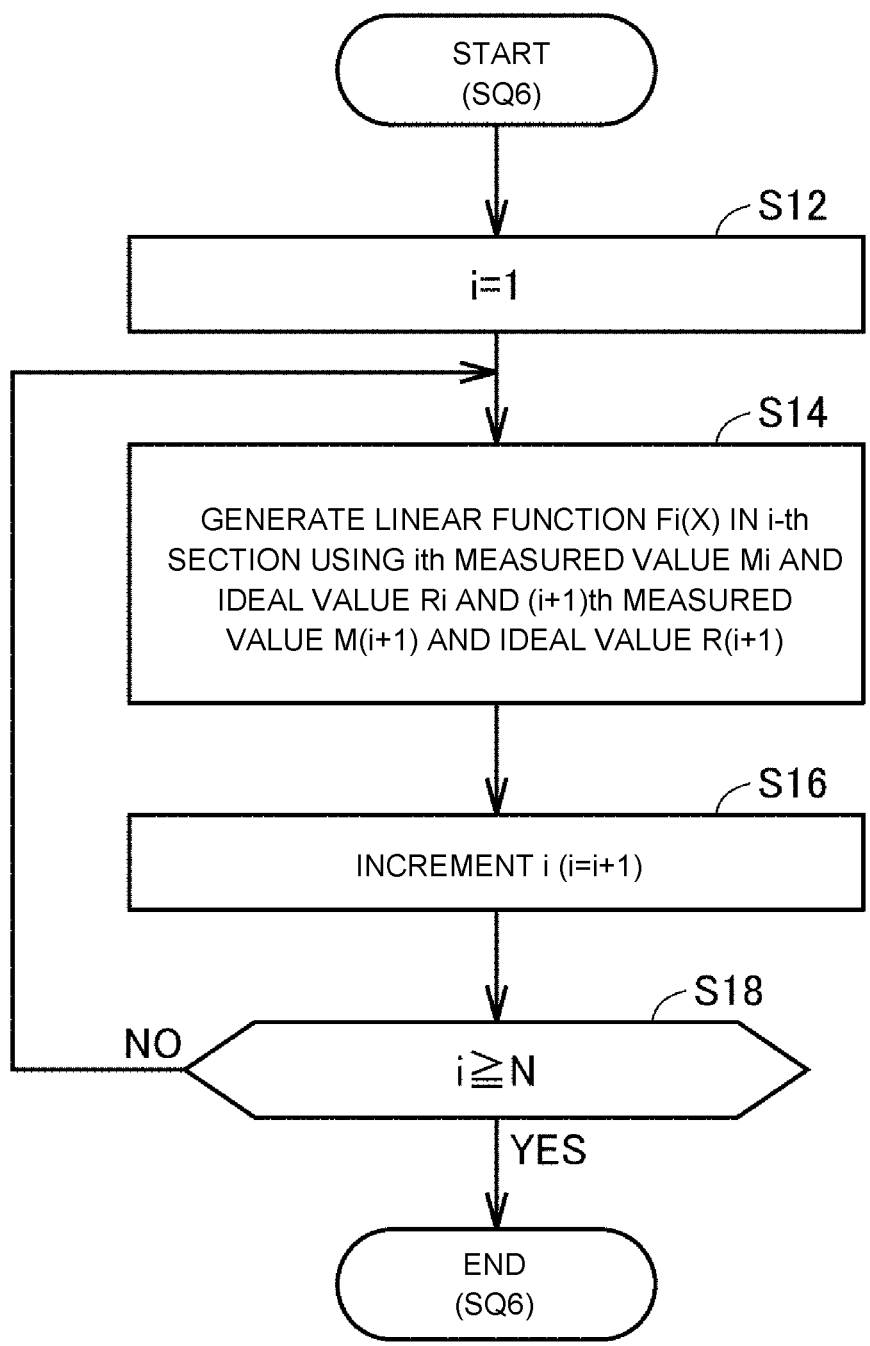
FIG. 8 is a flowchart explaining details of a process in a sequence SQ6 in FIG. 7.

FIG. 8 is a flowchart explaining details of a process in the sequence SQ6 in FIG. 7.

Referring to FIG. 8, in Step S12, the control unit 11 of the displacement sensor 2 sets a value of a variable i to 1. In Step S14, the control unit 11 generates the linear function Fi(X) in an i-th section Qi (refer to FIG. 4) by using a measured value and an ideal value input in i-th place and a measured value M and an ideal value R input in (i+1)-th place in the information processing device 3.

In Step S16, the control unit 11 increments i. That is, the control unit 11 increases a value of i by 1. In Step S18, the control unit 11 determines whether i is equal to or larger than N. Here, N indicates the number of sets of data items received by the displacement sensor 2 from the information processing device 3.

When it is determined that i is equal to or larger than N (YES in Step S18), the control unit 11 ends a series of processes. When it is determined that i is less than N (NO in Step S18), the control unit 11 advances the process to Step S14.

Figure 9:
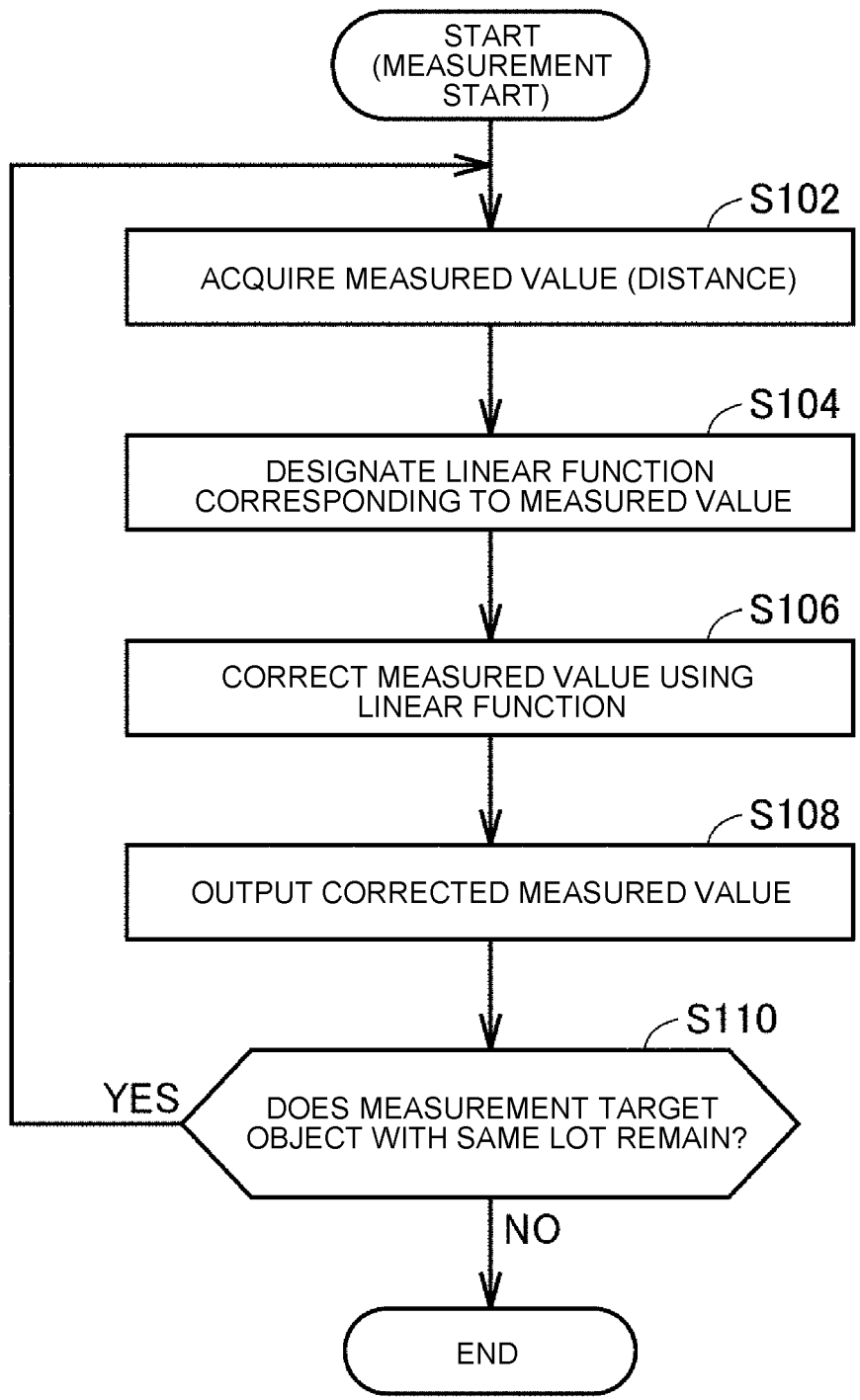
FIG. 9 is a flowchart explaining a process of correcting a measured value during the present measurement.

FIG. 9 is a flowchart explaining a process of connecting the measured value M during the present measurement.

Referring to FIG. 9, in Step S102, the control unit 11 of the displacement sensor 2 acquires the measured value M. That is, the control unit 11 calculates a distance to the measurement target surface (the front surface 821 of the thin film 820) based on a light beam received by the sensor head 20.

In Step S104, the control unit 11 designates a linear function Fi(X) corresponding to the measured value M. That is, the control unit 11 designates a linear function Fi(X) in a section Qi in which the measured value M is included among the plurality of linear functions Fi(X).

In Step S106, the control unit 11 corrects the measured value M using the designated linear function Fi(X). In Step S108, the control unit 11 outputs the corrected measured value (a measured value C). For example, the control unit 11 displays the corrected measured value on the display unit 14. In addition, the control unit 11 stores the corrected measured value in the storage unit 16 (not shown).

In Step S110, the control unit 11 determines whether the measurement target object 800 with the same lot remains. When it is determined that the measurement target object 800 with the same lot remains (YES in Step S110), the control unit 11 advances the process to Step S102. When it is determined that no measurement target object 800 with the same lot remains (NO in Step S110), the control unit 11 ends a series of processes.

F. Results

Figure 10:
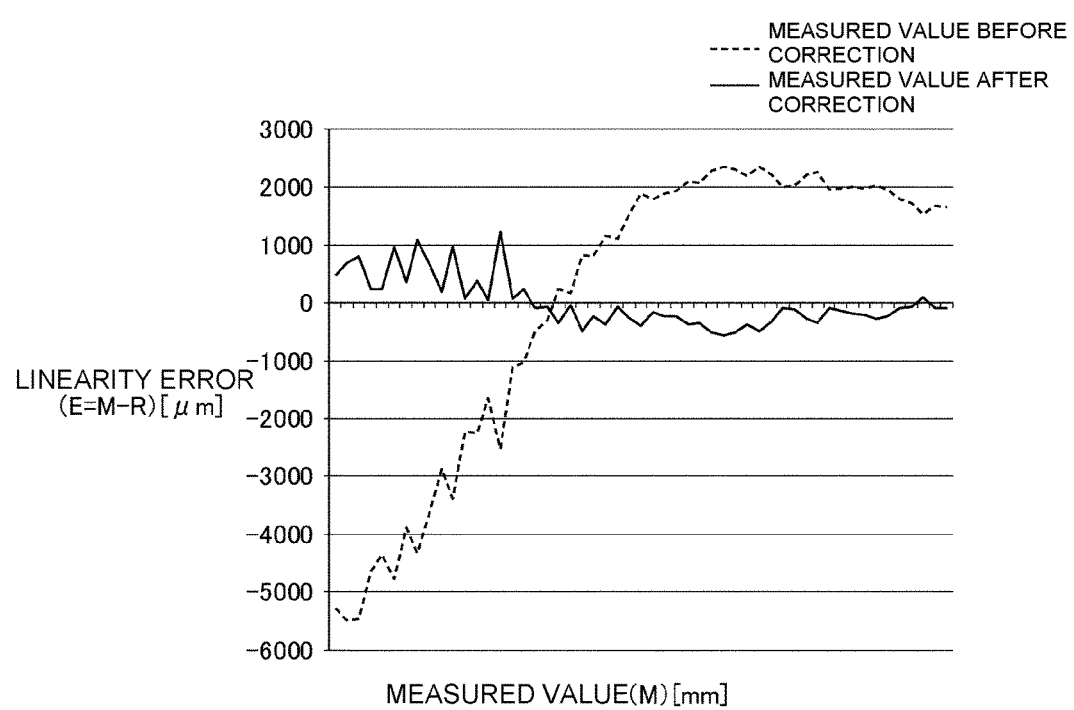
FIG. 10 is a diagram explaining a result of the correction process described above.

FIG. 10 is a diagram explaining a result of an embodiment of the correction process described above.

Referring to FIG. 10, for a certain measurement target object, measured values are obtained while changing a stage position 50 times or more. Measurement is not generally performed such many times, but it is in this case in order to verify an effect. Here, the vertical axis represents the linearity error E and the horizontal axis represents the measured value M measured by the displacement sensor 2.

The dashed line graph relates to the linearity error E (E=M−R) before correction. Specifically, the dashed line graph is obtained by connecting points of 53 linearity errors E by line segments. Here, these line segments themselves correspond to linear functions used for correction.

The solid line graph relates to the linearity error E (E=M−R) before correction. Specifically, the solid line graph is obtained by connecting points of 53 corrected linearity errors E by line segments.

Comparing the dashed line graph and the solid line graph, it can be understood that the linearity error E is reduced by correction.

G. Modified Example

While a configuration in which the sensor controller 10 generates the plurality of linear functions Fi(X) has been exemplified above, the embodiments of the disclosure are not limited thereto. The generated function is not limited to the linear function.

The generated function may be a quadratic function or a third or higher order function (high-order function). For example, in the example in FIG. 2, the generated function may be a second or higher order function that passes through seven points P1 to P7.

In addition, it is not necessary to generate a function that passes through points. For example, a function may be generated using a least-square method.

In addition, correction intervals (that is, intervals between points) may not be the same interval.

Such a modified example can be applied to Embodiments 2 and 3 described below.

Embodiment 2

In the present embodiment, a configuration in which a white light beam is emitted to a measurement target object through a member by which wavelength dispersion occurs according to a refractive index will be described. Typically, a configuration in which a white light beam is emitted to a measurement target object through a glass will be described.

Figure 11:
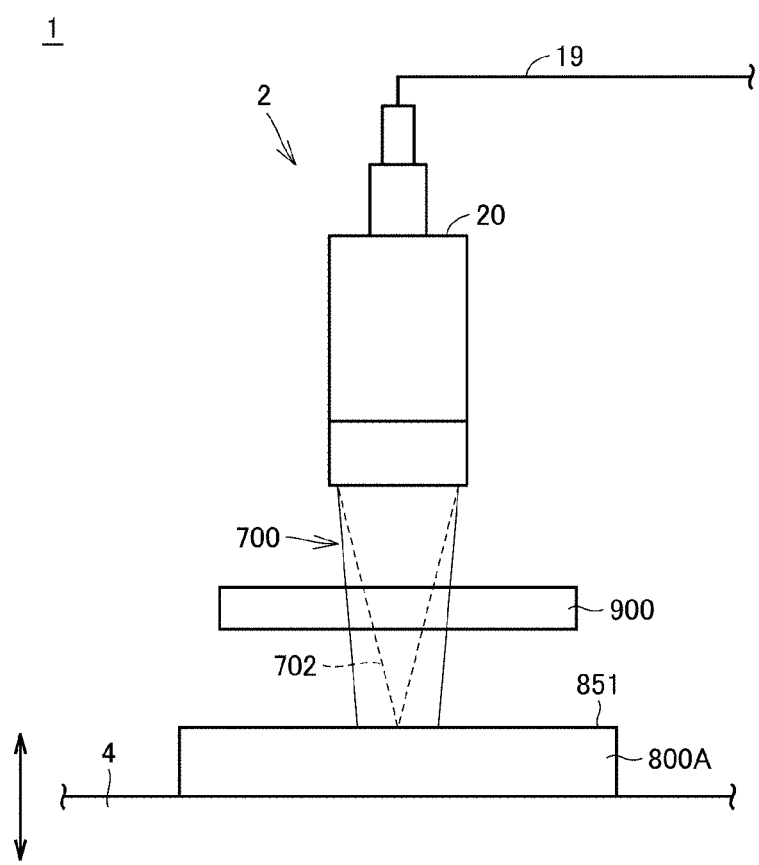
FIG. 11 is a diagram explaining another form of measurement.

FIG. 11 is a diagram explaining measurement in the present embodiment.

Referring to FIG. 11, the displacement sensor 2 measures a measurement target surface 851 of a measurement target object 800A.

A light beam 702 with a wavelength at which a focus is formed on the measurement target surface 851 is received by the sensor head 20 as a reflected light beam. The reflected light beam received by the sensor head 20 enters the sensor controller 10 through the light guiding unit 19. The sensor controller 10 calculates a distance (displacement) from the sensor head 20 to the measurement target surface 851 on the basis of the reflected light beam.

Incidentally, in measurement in the present embodiment, a distance to the measurement target surface 851 is calculated through a glass. In this case, according to wavelength dispersion due to the glass, the detected wavelength deviates from a wavelength at which a focus is formed on the measurement target surface 851 when it is assumed that there is no a glass. Therefore, in the present embodiment also, similarly to Embodiment 1, it is necessary to correct the measured value.

Specifically, also in the present embodiment, similarly to Embodiment 1, a linear function Fi(X) for correction is generated by the displacement sensor 2 in advance. Thus, during the measurement, using the linear function Fi(X) corresponding to the measured section Qi, the measured value is corrected. Specifically, the control unit 11 of the displacement sensor 2 performs correction using the above Formula (3).

When measurement is performed through such a transparent member, the above correction is performed. Therefore, it is possible to correct a nonlinear error due to wavelength dispersion in the transparent member. Therefore, it is possible to measure a distance to the measurement target surface 851 with high accuracy according to the displacement sensor 2.

Embodiment 3

In the present embodiment, similarly to Embodiment 2, a configuration in which a white light beam is emitted to a measurement target object through a member by which wavelength dispersion occurs according to a refractive index will be described. Specifically, a configuration in which the thickness of the transparent member (typically, a glass) is measured will be described.

Figure 12:
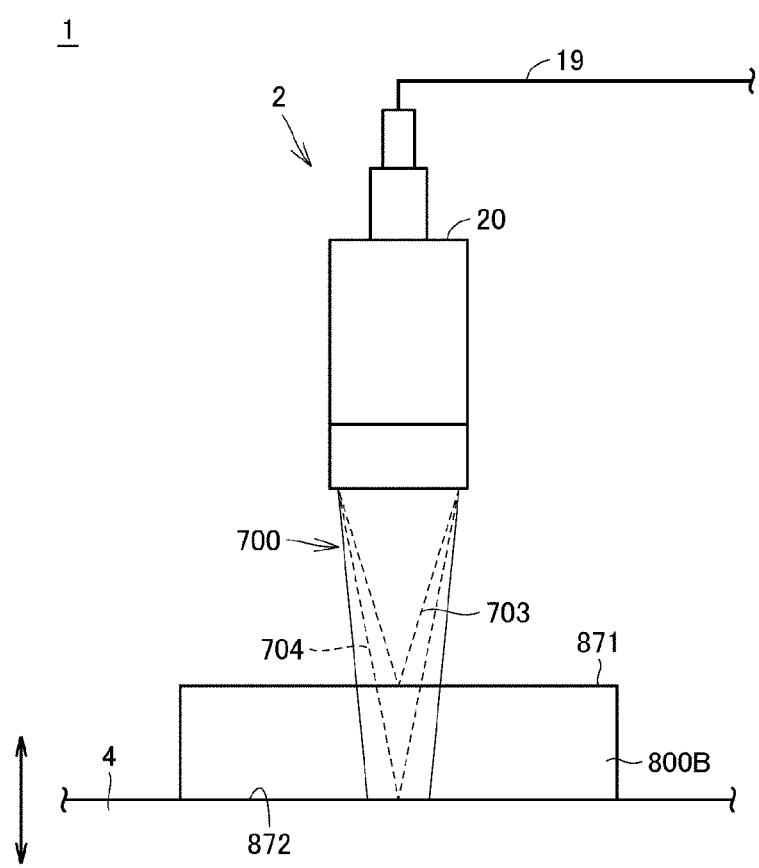
FIG. 12 is a diagram explaining still another form of measurement.

FIG. 12 is a diagram explaining measurement in the present embodiment.

Referring to FIG. 12, the displacement sensor 2 measures a thickness of a glass 800B which is a measurement target object. Specifically, the displacement sensor 2 calculates a distance between the sensor head 20 and a front surface 871 of the glass 800B and a distance between the sensor head 20 and a back surface 872 of the glass 800B and thus calculates the thickness of the glass 800B. Here, the "front surface" is a surface that is exposed to the outside, and is a surface on the side of the sensor head 20 in this example. The "back surface" is a surface that is in contact with the stage 4 and is a surface that is further away from the sensor head 20 than the front surface.

More specifically, a light beam 703 with a wavelength at which a focus is formed on the front surface 871 is received by the sensor head 20 as a reflected light beam. The reflected light beam received by the sensor head 20 enters the sensor controller 10 through the light guiding unit 19. The sensor controller 10 calculates a distance (displacement) from the sensor head 20 to the front surface 871 on the basis of the reflected light beam.

A light beam 704 with a wavelength at which a focus is formed on the back surface 872 is received by the sensor head 20 as a reflected light beam. The reflected light beam received by the sensor head 20 enters the sensor controller 10 through the light guiding unit 19. The sensor controller 10 calculates a distance (displacement) from the sensor head 20 to the back surface 872 on the basis of the reflected light beam.

Incidentally, in measurement in the present embodiment, when a distance to the back surface 872 is measured (calculated), the detected wavelength deviates due to wavelength dispersion causing by the glass 800B itself similarly to Embodiment 2. Therefore, in the present embodiment also, similarly to Embodiments 1 and 2, it is necessary to correct the measured value M.

Specifically, also in the present embodiment, similarly to Embodiment 1, a linear function Fi(X) for correction is generated by the displacement sensor 2 in advance. Thus, during the present measurement, using the linear function Fi(X) corresponding to the measured section Qi, the measured value is corrected. Specifically, the control unit 11 of the displacement sensor 2 performs correction using the above Formula (3).

A method of setting the ideal value R for generating the linear function Fi(X) is different from those in Embodiments 1 and 2. In Embodiments 1 and 2, the ideal value R is a value calculated from the stage position. In the present embodiment, a value obtained by adding an ideal thickness of the glass 800B to the measured value (distance) up to the front surface 871 is set as the ideal value R.

In this manner, the method of calculating the ideal value R in Embodiment 3 is different from the method of calculating the ideal value R in Embodiments 1 and 2. The reason for this is as follows.

In an embodiment, when only the back surface 872 is corrected and the thickness of the glass 800B is calculated (when the measured value of the front surface 871 is subtracted from the measured value of the back surface 872), an influence of a linearity error of the front surface 871 is received and the error increases. When the ideal value is obtained from the measured value of the front surface 871, the linearity error of the front surface 871 can be corrected. As a result, the thickness error can be reduced.

As described above, when the thickness of the transparent member is measured, if the above correction is performed, it is possible to correct a nonlinear error due to wavelength dispersion of the glass 800B itself that is a measurement target object. Therefore, according to the displacement sensor 2, it is possible to measure the thickness (specifically, a distance to the back surface) of the transparent member with high accuracy.

The embodiments disclosed here are only examples in all respects and should not be considered as restrictive. The scope of the disclosure is not defined by descriptions in the above embodiments but is defined by the appended claims, and is intended to encompass equivalents of the scope of the appended claims and all modifications falling within the scope of the appended claims.

What is claimed is:

1. A displacement measurement device comprising:
    a light projector configured to generate a light beam;
    a sensor head configured to emit the light beam to a measurement target object of which a measured value and an actual displacement are nonlinear so that a focus is formed on a measurement target surface of the measurement target object, and receive a light beam that is reflected at the measurement target surface within the emitted light beam;
    a memory configured to store a mathematical function using a distance between the sensor head and the measurement target surface as a variable; and
    a processor configured to calculate the distance based on a wavelength of the light beam received by the sensor head, wherein the distance comprises a first distance, and the measurement target object comprises a first measurement target object, and the processor is further configured to calculate a value of the mathematical function by using the first distance between the sensor head and a measurement target surface of the first measurement target object as a value of the variable, and corrects the calculated first distance using the calculated value of the mathematical function.

2. The displacement measurement device according to claim 1,
    wherein the distance further comprises a second distance, and the measurement target object further comprises a second measurement target object,
    wherein the first measurement target object as the measurement target object and the second measurement target object as the measurement target object have a thin film causing interference, and
    wherein the processor is further configured to calculate the second distance that is a distance between the sensor head and a front surface of the thin film by moving a stage to a plurality of positions while the second measurement target object is mounted on the stage that is movable in a direction of the sensor head, and
    to generate the mathematical function on the basis of the second distance calculated at each of the plurality of positions and a reference distance that serves as a reference between the sensor head and the front surface when the second distance is calculated.

3. The displacement measurement device according to claim 2, wherein the processor is further configured to generate the mathematical function based on the second distance and a difference between the second distance and the reference distance.

4. The displacement measurement device according to claim 3,
    wherein the processor is configured to divide a numerical value range of the variable in a plurality of sections using the second distance calculated at each of the plurality of positions, and
    to generate the mathematical function for each of the plurality of sections.

5. The displacement measurement device according to claim 4, wherein the mathematical function of each of the sections is a linear mathematical function.

6. A measurement system including the displacement measurement device according to claim 5, and an information processing device that is communicatively connected to the displacement measurement device,
    wherein the information processing device receives a user operation by which the second distance that is calculated at each of the plurality of positions and the reference distance is inputted to the information processing device, and
    transmits the second distance that is calculated at each of the plurality of positions and the reference distance to the displacement measurement device.

7. A measurement system including the displacement measurement device according to claim 4, and an information processing device that is communicatively connected to the displacement measurement device,
    wherein the information processing device receives a user operation by which the second distance that is calculated at each of the plurality of positions and the reference distance is inputted to the information processing device, and
    transmits the second distance that is calculated at each of the plurality of positions and the reference distance to the displacement measurement device.

8. A measurement system including the displacement measurement device according to claim 3, and an information processing device that is communicatively connected to the displacement measurement device,
    wherein the information processing device receives a user operation by which the second distance that is calculated at each of the plurality of positions and the reference distance is inputted to the information processing device, and
    transmits the second distance that is calculated at each of the plurality of positions and the reference distance to the displacement measurement device.

9. A measurement system including the displacement measurement device according to claim 2, and an information processing device that is communicatively connected to the displacement measurement device,
    wherein the information processing device receives a user operation by which the second distance that is calculated at each of the plurality of positions and the reference distance is inputted to the information processing device, and
    transmits the second distance that is calculated at each of the plurality of positions and the reference distance to the displacement measurement device.

10. The displacement measurement device according to claim 1,
    wherein the distance further comprises a second distance, and the measurement target object further comprises a second measurement target object,
    wherein the measurement target object is an object having a first surface as the measurement target surface and a second surface that is further away from the sensor head than the first surface and causing wavelength dispersion, wherein the processor is configured to calculate the second distance between the sensor head and the measurement target surface of the second measurement target object by moving a stage to a plurality of positions while the second measurement target object that is the measurement target object is mounted on the stage that is movable in a direction of the sensor head, and to generate the mathematical function on the basis of the second distance calculated at each of the plurality of positions and a reference distance when the second distance is calculated, and wherein the reference distance is a distance obtained by adding an ideal thickness of the measurement target object to a distance from the sensor head to the first surface.

11. The displacement measurement device according to claim 10, wherein the processor is further configured to generate generates the mathematical function based on the second distance and a difference between the second distance and the reference distance.

12. A measurement system including the displacement measurement device according to claim 10, and an information processing device that is communicatively connected to the displacement measurement device, wherein the information processing device receives a user operation by which the second distance that is calculated at each of the plurality of positions and the reference distance is inputted to the information processing device, and transmits the second distance that is calculated at each of the plurality of positions and the reference distance to the displacement measurement device.

13. A displacement measurement device comprising:
a light projector configured to generate a light beam having a predetermined wavelength width;
a sensor head configured to emit the light beam through a member by which wavelength dispersion occurs according to a refractive index so that a focus is formed on a measurement target surface of a measurement target object, and receive a light beam that is reflected at the measurement target surface within the emitted light beam,
a memory configured to store a mathematical function using a distance between the sensor head and the measurement target surface as a variable; and
a processor configured to calculate the distance based on a wavelength of the light beam received by the sensor head, wherein the distance comprises a first distance, and the measurement target object comprises a first measurement target object, and the processor is further configured to calculate a value of the mathematical function by using the first distance between the sensor head and a measurement target surface of the first measurement target object as a value of the variable, and corrects the calculated first distance using the calculated value of the mathematical function.

14. The displacement measurement device according to claim 13,
wherein the distance further comprises a second distance, and the measurement target object further comprises a second measurement target object,
wherein the processor is further configured to calculate the second distance that is a distance between the sensor head and a measurement target surface of the second measurement target object as the measurement target object by moving a stage to a plurality of positions while the second measurement target object that is the measurement target object is mounted on the stage that is movable in a direction of the sensor head, and
to generate the mathematical function on the basis of the second distance calculated at each of the plurality of positions and a reference distance that serves as a reference between the sensor head and the measurement target surface when the second distance is calculated.

15. The displacement measurement device according to claim 14, wherein the processor is further configured to generate the mathematical function based on the second distance and a difference between the second distance and the reference distance.

16. A measurement system including the displacement measurement device according to claim 14, and an information processing device that is communicatively connected to the displacement measurement device,
wherein the information processing device receives a user operation by which the second distance that is calculated at each of the plurality of positions and the reference distance is inputted to the information processing device, and
transmits the second distance that is calculated at each of the plurality of positions and the reference distance to the displacement measurement device.

17. A displacement measurement method comprising:
a step of generating a light beam;
a step of emitting the light beam to a measurement target object of which a measured value and an actual displacement are nonlinear from a sensor head so that a focus is formed on a measurement target surface of the measurement target object;
a step of receiving a light beam that is reflected at the measurement target surface within the emitted light beam;
a step of calculating a distance between the sensor head and the measurement target surface based on a wavelength of the received light beam;
a step of calculating a value of a mathematical function by serving the calculated distance as a value of a variable in the mathematical function using the distance as the variable; and
a step of correcting the calculated distance using the calculated value of the mathematical function.

18. A displacement measurement method comprising:
a step of generating a light beam having a predetermined wavelength width;
a step of emitting the light beam from a sensor head through a member by which wavelength dispersion occurs according to a refractive index so that a focus is formed on a measurement target surface of a measurement target object;
a step of receiving a light beam that is reflected at the measurement target surface within the emitted light beam;
a step of calculating a distance between the sensor head and the measurement target surface based on a wavelength of the received light beam;
a step of calculating a value of a mathematical function by serving the calculated distance as a value of a variable in the mathematical function using the distance as the variable; and a step of correcting the calculated distance using the calculated value of the mathematical function.

\* \* \* \* \*